*INVENTOR.*
LAURENCE H. HUNDT
CARL H. KING
BY John W. Michael
ATTORNEY

United States Patent Office 2,859,542
Patented Nov. 11, 1958

2,859,542

BATTERY DISPLAY

Laurence H. Hundt, Thiensville, and Carl H. King, Milwaukee, Wis., assignors to Globe-Union Inc., Milwaukee, Wis., a corporation of Delaware Application September 28, 1954, Serial No. 458,890

2 Claims. (Cl. 35—51)

This invention relates to instructional displays and particularly to a unitary plaster display model of a multipartite product to illustrate by comparison the various constructions and grades of that product.

Heretofore, it has been the practice to display a product and its internal parts by cutting through a part of the product itself so that an internal sectional view was obtained as well as a view of the external surface. This has been accomplished by taking a representative piece of the product to be displayed and cutting away a part so that a sectional view was obtained. This method has been satisfactory in the past to display some products; however, with the advent of large scale advertising, it is necessary to produce display models which are accurate reproductions, with good appearance and easy production at low cost. In other words, it is necessary to mass produce model advertising displays with sectional views.

It is the first object of this invention to produce a display model which accurately and effectively presents the product with a sectional view.

It is the second object of this invention to produce a display model which is light weight so that it is easily handled and with smooth surface so that it may be easily painted in an attractive manner.

It is a further object of this invention to provide a low cost display model which can be produced in a unitary structure thereby eliminating the cost of assembly but still retaining the distinction between the individual parts for customer demonstration.

The above mentioned objects and other ancillary thereto are accomplished in this invention as applied to a battery display in the following manner:

A mold is made of a typical battery with a sectional view showing a number of cells (equal to the number of different types of cell structure to be displayed). Except for the different types of cell structures, the model has the appearance and dimensions of a standard battery. The model may be made of any plastic or plastery material; the present material being used is reinforced plaster. The model can then be painted to resemble a standard battery or with more attractive colors to facilitate advertising. The individual cells are labeled to indicate the physical characteristics of the cells, i. e. number of plates, type of separators, rated capacity and the guarantee. The plates and separators are of the exact dimensions of those in the finished batteries. With complete information, either illustrated or written on the cells, the model is ideal as an advertising medium.

The features of the invention described herein which we consider new and useful and therefore patentable are set forth in the claims below. The details and scope of the invention itself can best be understood by reading the specifications and analyzing the drawings, in which:

Figure 1:
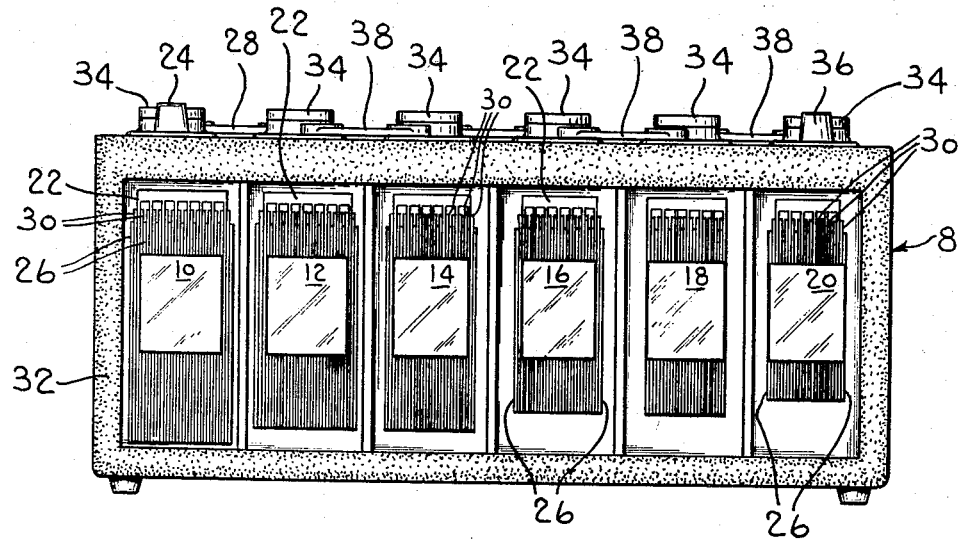
Fig. 1 is a view in front elevation of a model display battery embodying the present invention.
Figure 2:
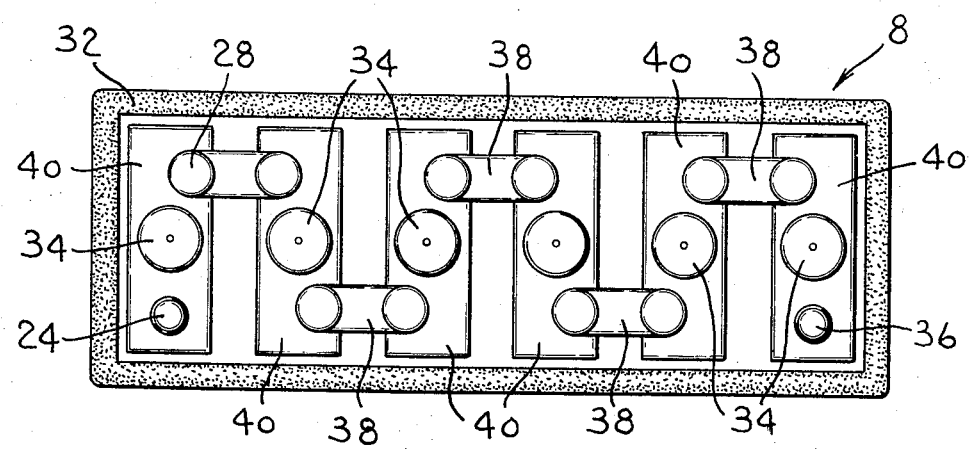
Fig. 2 is a top plan view of such model display battery.
Figure 3:
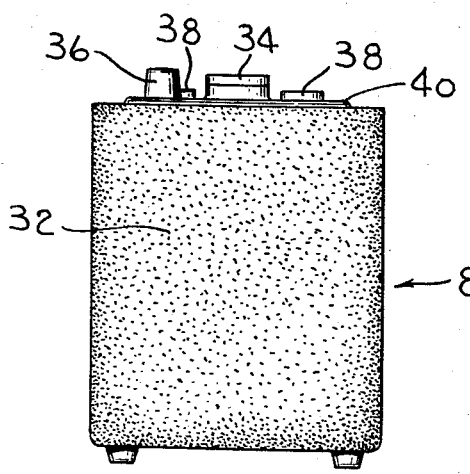
Fig. 3 is a view in end elevation of such model display battery.

Elements which are most important for effective display models are: (1) that the display model give a complete disclosure of the illustrated construction of the product, (2) that the surface be of such a nature that it can be attractively painted, (3) that the model be light weight so that it can be easily moved and carried, and (4) that the model be of simple low cost construction.

The first of these essentials is illustrated in the drawings by a molded battery display model 8 having a front face resembling the interior of a battery after the wall has been removed. Six cells separately identified as 10, 12, 14, 16, 18, 20 are shown, each being similar in appearance to a cell in a battery except that each illustrates a cell of a different quality. Each cell group illustrates in relief positive and negative plates interleaved with separators 30. In the case of cell group 10 the positive plates 22 are interconnected by a standard terminal ending in a positive post 24 and the negative plates 26 are interconnected by a standard terminal ending in cell connector 28. The plates are spaced by separators 30. Cell group 10 illustrates a 120 ampere hour (51 plate) battery guaranteed for 48 months using rubber separators. Cell group 12 illustrates a 110 ampere hour (51 plate) battery guaranteed for 36 months using Fiberglas separators. Cell group 14 illustrates a 100 ampere hour (45 plate) battery guaranteed 24 months using wood separators. Cell group 16 illustrates a 90 ampere hour (45 plate) battery guaranteed 18 months using wood fiber separators. Cell group 18 illustrates an 80 ampere hour (39 plate) battery guaranteed for 12 months using wood fiber separators. Cell group 20 illustrates a 70 ampere hour (39 plate) battery guaranteed for 6 months using wood fiber separators. Thus by quick comparison a prospective purchaser of a battery can understand the differences which cause some batteries to be different in price from others.

The model also illustrates: a battery case 32 having a rough surface similar to the standard battery; vent plugs 34, negative terminal post 36; cell connectors 38 and covers 40. Thus several different batteries are accurately represented in one display unit so that the overall appearance is substantially indistinguishable from a standard battery.

The second element, attractive surface, is accomplished by molding the model from plaster or the like which permits the various parts to be easily and attractively painted as in the original. For example the posts and plates 22 and 26 are painted grey to resemble lead, the battery surface is painted black, the separators 30 are painted to resemble either rubber (cell 10), Fiberglas (cell 12), wood (cell 14) or wood fiber (cells 16, 18, 20).

The third element, light weight, is achieved by the use of plastic or plastery material throughout. In addition, the entire product is hollow without a bottom and with the walls being less than 1 inch in thickness.

The fourth element, simple low cost construction, is obtained by using a molded unitary model of reinforced plaster which displays in one unit a number of different batteries.

Although only one specific embodiment of this invention has been shown and described, many modifications are possible. This invention, therefore, is not to be restricted except in so far as is necessitated by the prior art and by the spirit of the appended claims.

We claim as our invention:

1. A simulated cut-away storage battery having more than two cell compartments of identical size, cell groups in said compartments with plates and separators exposed to view, the plates and separators of each cell group varying in size and number from the plates and separators of the other cell groups to visibly illustrate by comparison the physical differences between storage batteries of different ratings but same outer dimensions.

2. The article as claimed in claim 1 in which said plates and separators of each cell group are arranged in progression according to the height of the plates and separators with the tops in alinement to resemble a vertical bar chart in general appearance.

References Cited in the file of this patent

UNITED STATES PATENTS

| | | |
|---|---|---|
| 1,688,249 | Stenz | Oct. 16, 1928 |
| 2,296,345 | Guy | Sept. 22, 1942 |

FOREIGN PATENTS

| | | |
|---|---|---|
| 351,350 | Great Britain | June 25, 1931 |